(12) United States Patent
Wang et al.

(10) Patent No.: US 10,673,704 B2
(45) Date of Patent: Jun. 2, 2020

(54) SYSTEM AND METHOD OF DYNAMIC HARDWARE POLICER ALLOCATION

(71) Applicant: Arista Networks, Inc., Santa Clara, CA (US)

(72) Inventors: Michael Chih-Yen Wang, Vancouver (CA); Hugh W. Holbrook, Palo Alto, CA (US); Adam James Sweeney, San Jose, CA (US); Zhong Xu, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 126 days.

(21) Appl. No.: 15/898,158

(22) Filed: Feb. 15, 2018

(65) Prior Publication Data

US 2018/0234297 A1    Aug. 16, 2018

Related U.S. Application Data

(60) Provisional application No. 62/459,486, filed on Feb. 15, 2017.

(51) Int. Cl.
| | |
|---|---|
| *H04L 12/00* | (2006.01) |
| *H04L 12/24* | (2006.01) |
| *H04L 29/08* | (2006.01) |
| *H04L 12/813* | (2013.01) |
| *H04L 12/26* | (2006.01) |
| *H04L 12/851* | (2013.01) |

(52) U.S. Cl.
CPC .......... *H04L 41/0893* (2013.01); *H04L 47/20* (2013.01); *H04L 67/34* (2013.01); *H04L 41/24* (2013.01); *H04L 43/0894* (2013.01); *H04L 47/24* (2013.01)

(58) Field of Classification Search
CPC ..... H04L 43/0894; H04L 47/20; H04L 47/24; H04L 67/34; H04L 41/24; H04L 41/0893
USPC .................................. 709/222–226; 717/174
See application file for complete search history.

(56) References Cited

U.S. PATENT DOCUMENTS

| | | | |
|---|---|---|---|
| 6,393,474 B1 * | 5/2002 | Eichert | H04L 41/0893 709/221 |
| 6,768,901 B1 * | 7/2004 | Osborn | G06F 9/5011 455/230 |
| 7,339,942 B2 * | 3/2008 | Morgan | H04L 12/4625 370/412 |

(Continued)

*Primary Examiner* — Frantz Coby
(74) *Attorney, Agent, or Firm* — Haley Guiliano LLP (57) ABSTRACT

A method and apparatus of a network element that installs a control plane data rule from system memory to specialized hardware memory in a network element is described. In an exemplary embodiment, the network element receives control plane data processing statistics of control plane data that is received by the network element, where the control plane data is policed using a plurality of control plane data policing rules stored in the system memory. The network element further determines that a candidate policing rule is being utilized greater than a threshold based on at least the control plane data processing statistics, where the candidate policing rule is one of the plurality of control plane data policing rules stored in the system memory. The network element additionally installs the candidate policing rule in the specialized hardware memory, where the candidate policing rule is subsequently used by the network element to police the control plane data.

25 Claims, 8 Drawing Sheets

(56) References Cited

U.S. PATENT DOCUMENTS

| | | | |
|---|---|---|---|
| 7,733,891 B2* | 6/2010 | Reynolds | H04L 41/0806 370/412 |
| 8,018,955 B2* | 9/2011 | Agarwal | H04L 67/18 370/401 |
| 8,274,895 B2* | 9/2012 | Rahman | H04L 47/10 370/235 |
| 8,339,959 B1* | 12/2012 | Moisand | H04L 63/0236 370/235 |
| 8,352,954 B2* | 1/2013 | Gokhale | G06F 9/5016 718/105 |
| 8,467,291 B2* | 6/2013 | Lovsen | H04L 12/1471 370/230 |
| 8,479,211 B1* | 7/2013 | Marshall | G06F 16/134 718/104 |
| 8,539,197 B1* | 9/2013 | Marshall | G06F 13/00 711/112 |
| 8,606,893 B2* | 12/2013 | Sanchez Santisto | H04L 12/14 709/222 |
| 8,640,186 B2* | 1/2014 | Castellanos Zamora | H04L 47/724 726/1 |
| 8,776,050 B2* | 7/2014 | Plouffe | G06F 9/45537 718/1 |
| 8,782,621 B2* | 7/2014 | Slavin | G06F 8/31 717/140 |
| 8,782,656 B2* | 7/2014 | Accola | G06F 9/5011 718/104 |
| 8,788,757 B2* | 7/2014 | Daly | G06F 12/126 711/122 |
| 8,843,992 B2* | 9/2014 | Fernandez Alonso | H04L 65/1016 726/1 |
| 9,485,118 B1* | 11/2016 | Atlas | H04L 47/10 |
| 9,542,221 B2* | 1/2017 | Harris | G06F 9/4881 |
| 9,729,582 B2* | 8/2017 | Loo | H04L 63/20 |
| 2002/0188720 A1* | 12/2002 | Terrell | H04L 47/10 709/225 |
| 2008/0291923 A1* | 11/2008 | Back | H04L 45/04 370/396 |
| 2009/0187968 A1* | 7/2009 | Roese | H04L 41/0893 726/1 |
| 2012/0137281 A1* | 5/2012 | Kleiner | G06F 8/61 717/174 |
| 2014/0176583 A1* | 6/2014 | Abiezzi | G06T 1/20 345/522 |
| 2016/0162335 A1* | 6/2016 | Sandstrom | G06F 9/5027 718/103 |
| 2016/0316384 A1* | 10/2016 | Avila Gonzalez | H04L 47/10 |
| 2017/0093924 A1* | 3/2017 | Loo | H04L 63/20 |
| 2017/0366605 A1* | 12/2017 | Chang | H04L 47/70 |
| 2018/0115470 A1* | 4/2018 | Huang | H04L 41/0873 |

* cited by examiner

SYSTEM AND METHOD OF DYNAMIC HARDWARE POLICER ALLOCATION

RELATED APPLICATIONS

Applicant claims the benefit of priority of prior, provisional application Ser. No. 62/459,486, filed Feb. 15, 2017, the entirety of which is incorporated by reference.

FIELD OF INVENTION

This invention relates generally to data networking, and more particularly, to dynamically installing control plane policing policy rules in hardware.

BACKGROUND OF THE INVENTION

A network element (such as a router or switch) transmits and receives network data using one or more ports of that network element. Each port on the network element has a physical link speed that limits the rate at which network data can be transmitted from that port. The network element uses one or more queues to store the network data that is to be transmitted from one of the ports of the network element.

One type of network data that is transmitted from the one or more ports is control plane data. This is network data that is to be transmitted to a control plane of the network element, and processed by a control plane processor. The control plane processor is responsible for configuring the network element, maintaining forwarding routes for the network element, and for performing other network element functions. Thus, proper and expedient processing of control plane data is essential to the healthy functioning of a network element, as well as to the network to which the network element belongs.

Denial of service attacks are a threat to network elements. These types of attacks may involve otherwise innocuous network traffic, but result in a control plane processor of a network element being made unavailable for the normal processing of control plane functions. This is generally achieved purposefully by an attacker, or unknowingly by a benign source, by flooding the control plane processor with control plane data messages. The control plane data may be innocuous, and are only sent to the control plane for the purpose of consuming processing resources. The volume of innocuous control plane data in a denial of service attack, which is queued and forwarded to the control plane processor, can cause the control plane processor to expend resources to process the flood of attack traffic, thereby denying or severely limiting services to legitimate control plane data (e.g., protocol network data, routing network data, etc.).

SUMMARY OF THE DESCRIPTION

A method and apparatus of a network element that installs a control plane data rule from system memory to specialized hardware memory in a network element is described. In an exemplary embodiment, the network element receives control plane data processing statistics of control plane data that is received by the network element, where the control plane data is policed using a plurality of control plane data policing rules stored in the system memory. The network element further determines that a candidate policing rule is being utilized greater than a threshold based on at least the control plane data processing statistics, where the candidate policing rule is one of the plurality of control plane data policing rules stored in the system memory. The network element additionally installs the candidate policing rule in the specialized hardware memory, where the candidate policing rule is subsequently used by the network element to police the control plane data.

In another embodiment, the network element receives the control plane data processing statistics of control plane data that is received by the network element, where the control plane data is policed using a plurality of control plane data policing rules stored in the specialized hardware memory. The network element further determines that a candidate policing rule is being utilized less than a threshold based on at least the control plane data processing statistics, where the candidate policing rule is one of the plurality of control plane data policing rules stored in the specialized hardware memory. The network element additionally evicts the candidate policing rule from the specialized hardware memory, where the candidate policing rule is stored in system memory and is subsequently used by the network element to police the control plane data Other methods and apparatuses are also described.

BRIEF DESCRIPTION OF THE DRAWINGS

The present invention is illustrated by way of example and not limitation in the Figures of the accompanying drawings in which like references indicate similar elements.

DETAILED DESCRIPTION

A method and apparatus of a network element that installs a control plane data rule from system memory to specialized hardware memory in a network element is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that installs a control plane data policing rule from system memory to specialized hardware memory in a network element is described. In one embodiment, the network element polices control plane data received by the network element, where the control plane data is data that is processed by a central processing unit of the control plane. Control plane data can include data that includes a destination address corresponding to an address of the network element. In addition, the control plane data can correspond to a plurality of different classes of control plane traffic, such as routing protocol messages, routing table messages, routing decisions messages, route update messages, unresolved traffic messages, L2 protocol messages, link aggregation control protocol messages, and/or other types of data as described further below.

In one embodiment, the network element polices the control plane data using policing rules that can be stored in either in software, hardware, or both. In this embodiment, policing rules in software are stored in system memory, whereas policing rules in hardware can be stored in a specialized memory. For example and in one embodiment, the specialized memory can include ternary content addressable memory (TCAM) or other types of content addressable memory. In another example, and embodiment, the specialized memory includes a TCAM to store one or more classification rules and other memory to store policies corresponding to the classification rules. In one embodiment, storing policy rules in software can allow for the storage of more rules than are available for storage in hardware. Storing policy rules in software, however, can lead to slower processing of the control plane data as the CPU will perform a lookup on each packet in the control plane data using the software policing rules. In contrast, while a smaller number of policing rules can be stored in hardware, the processing of these rules is much faster because using a content addressable memory, such as a TCAM, allows the network element a much faster rules look up for each packet in the control plane data. Furthermore, by processing packets using the policing rules stored in hardware, a smaller number of packets maybe processed by the policing rules stored in software, which can lead to a reduction in a central processing unit packet processing load.

In another embodiment, the network element can dynamically install in or evict policing rules from hardware based on the utilization of each of these rules. In one embodiment, the network element uses data from the software and hardware counters to determine which of the policing rules currently stored in the software should be installed in the hardware. In addition, the network element uses the counter data to determine if any of the currently installed rules in the hardware should be evicted from the hardware.

The network element, in one embodiment, periodically analyzes the software counters and/or software policer internal state (e.g., the fill of any internal token bucket or equivalent used by the software policer) to determine if one or more of the policing rules should be installed in hardware. In this embodiment, if one of the counters corresponding to a policing rule is experiencing a high volume of packets, then this rule may be a candidate to be installed in hardware, where the matching is more efficient than in software. Furthermore, the network element periodically analyzes the hardware counters to determine if one or more of the policing rules should be evicted from hardware. In this embodiment, if one of the counters corresponding to a policing rule is experiencing a low volume of packets, then this rule may be a candidate to be evicted from hardware.

Figure 1:
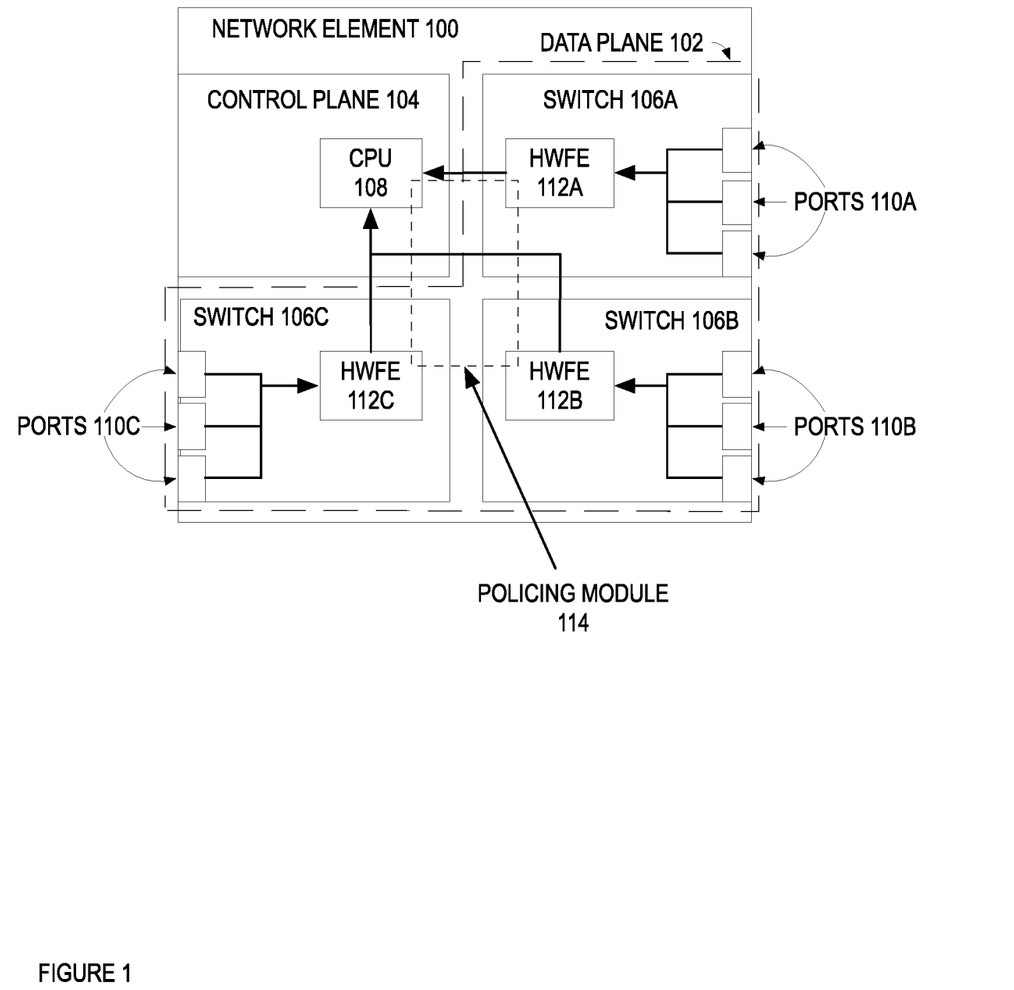
FIG. 1 is a block diagram of one embodiment of a network element that includes a control plane and multiple data planes, with the data plane communicating data to the control plane.

FIG. 1 is a block diagram of one embodiment of a network element 100 that includes a control plane 104 and a data plane 102, with the data plane 102 communicating data to the control plane 104. In one embodiment, the data plane 102 receives, processes, and forwards network data using various configuration data (e.g. packet forwarding (routing, switching, or another type of packet forwarding), security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface. The data plane 102 includes multiple switches 106A-C that can each receive, process, and/or forward network traffic. In one embodiment, each switch 106A-C includes a hardware forwarding engine 112A-C and ports 110A-C, respectively. In one embodiment, the network element 100 can be a switch, router, hub, bridge, gateway, etc., or any type of device that can communicate data packets with a network. In one embodiment, the network elements 100 can be a virtual machine.

In one embodiment, the control plane 104 includes a central processing unit (CPU) 108. As discussed herein, CPU 108 is interchangeably referred to as a control plane processor of network element 100. The CPU 108 is used to process information for the control plane 104 and write configuration data for hardware forwarding engines 112A-C in the network interface devices 106A-C. The information processed by CPU 108 includes, for example, control plane data corresponding to a plurality of different classes of control plane traffic, such as routing protocol messages, routing table messages, routing decisions messages, route update messages, unresolved traffic messages, L2 protocol messages, link aggregation control protocol messages, link layer state updates messages (e.g., spanning tree messages), link state update messages (e.g., link aggregation control protocol messages for a link aggregation group, bidirectional forwarding detection messages, etc.), exception packets that cannot be dealt with in hardware (e.g., router alerts, transmission time interval messages, maximum transmission size exceeded messages, etc.), program messages (e.g., packets from a controller instructing the programming of a network element), messages for routing table misses, time control messages (e.g., precision time protocol messages), messages for packets marked as being of interest for snooping (e.g., access control list logging and port mirroring messages), messages used to collect traffic diagnostics, address resolution messages (ARP) requests and replies, neighbor solicitation requests and replies, general communication to the control plane of the networking device, etc. CPU 108 processes the control plane data to perform control management updates and/or respond with control message responses (e.g., routing decisions, protocol updates, traffic resolutions, etc.).

In one embodiment, the data plane 102 receives, processes, and forwards network data, including control plane data, using various configuration data (e.g., forwarding, security, quality of service (QoS), and other network traffic processing information). The data plane 102 includes multiple switches 106A-C that can each receive, process, and/or forward network traffic. Each of the switches 106A-C includes multiple ports 116A-C that are used to receive and transmit network data.

In one embodiment, for each received unit of network data (e.g., a packet), the data plane 102 determines a destination address for the network data, looks up the requisite information for that destination in one or more tables stored in the data plane, and forwards the data out the proper outgoing interface, for example, one of the interface devices 106A-C. In one embodiment, each switch 106A-C includes one or more hardware forwarding engines (HWFE (s)) 112A-C and ports 116A-C, respectively. Each hardware forwarding engine 112A-C forwards data for the network element 100, such as performing routing, switching, or other types of network forwarding.

In one embodiment, for each received unit of control plane data, the data plane 102 forwards the control plane data to the CPU 108 (e.g., the control plane processor). In one embodiment, the control plane 104 gathers configuration data for the hardware forwarding engines 112A-C in control plane data messages from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 112A-C.

In one embodiment, to protect the efficient and healthy functioning of CPU 108, the network element 102 includes the policing module 114. In this embodiment, the policing module 114 polices the control plane data from the switches 106A-C forwarded to the CPU 108. The policing module 114 can be configured to minimize the latency of some type of network traffic, to apply traffic shaping policies on the overall flow of traffic through the network element or within a larger network topology, or to apply shaping and bandwidth policies to control plane data being forwarded to the CPU 108. Proper determination of real-time latency data within the network can be key to the implementation of effective QoS policy. In one embodiment, policing module 114 applies shaping (e.g., a maximum allowable rate) and bandwidth (e.g., a minimum throughput rate for a message queue) policies to the control plane data. Furthermore, policing module 114 can monitor for evidence of an ongoing attack, such as a denial of service attack, at a port using the policing rules. In one embodiment, the network element 100 polices network data (e.g., control plane data or network data processed by the data plane 102) using one or more policing rules. In this embodiment, a policing rule is used to monitor network data for compliance with a policy and, optionally, to take steps to enforce this policy. In one embodiment, policing can have these components: (i) monitoring a rate of a class of network data; (ii) comparing the monitored rate to a threshold; and (iii) optionally taking an action when the rate is above the threshold, where the actions can include, but not limited to, dropping packets, marking packets, changing the QoS handling of the packets, some other type of action, and/or a combination thereof.

In this embodiment, each policing rule includes a classification and a policy. The classification is used to determine what type, or class, of network data is associated with the policy. A classification can be based on a packet protocol, address, port, and/or some other characteristic of the network data. The policy can be a rule that is used to monitor and/or rate limit the network data (e.g., overall rate limit, committed information rate, burst size, queue depth, and/or other types of traffic shaping or policing parameters). For example and in one embodiment, a policing rule can be to police Border Gateway Protocol (BGP) packets to a committed information rate of 200 packets per second (pps). In this example, the classification would be BGP packets and the policy limiting the committed information rate to 200 pps. If the rate of the BGP packets exceed this rate, the excess packets could be marked, dropped, left as-is, or some other action could be taken. In one embodiment, the policing rules can be used to police network data that is processed by the control plane 104. In one embodiment, the policing module 114 includes components that are part of the HWFE 112A-C and the CPU 108. The policing module is further described in FIG. 2 below.

Figure 2:
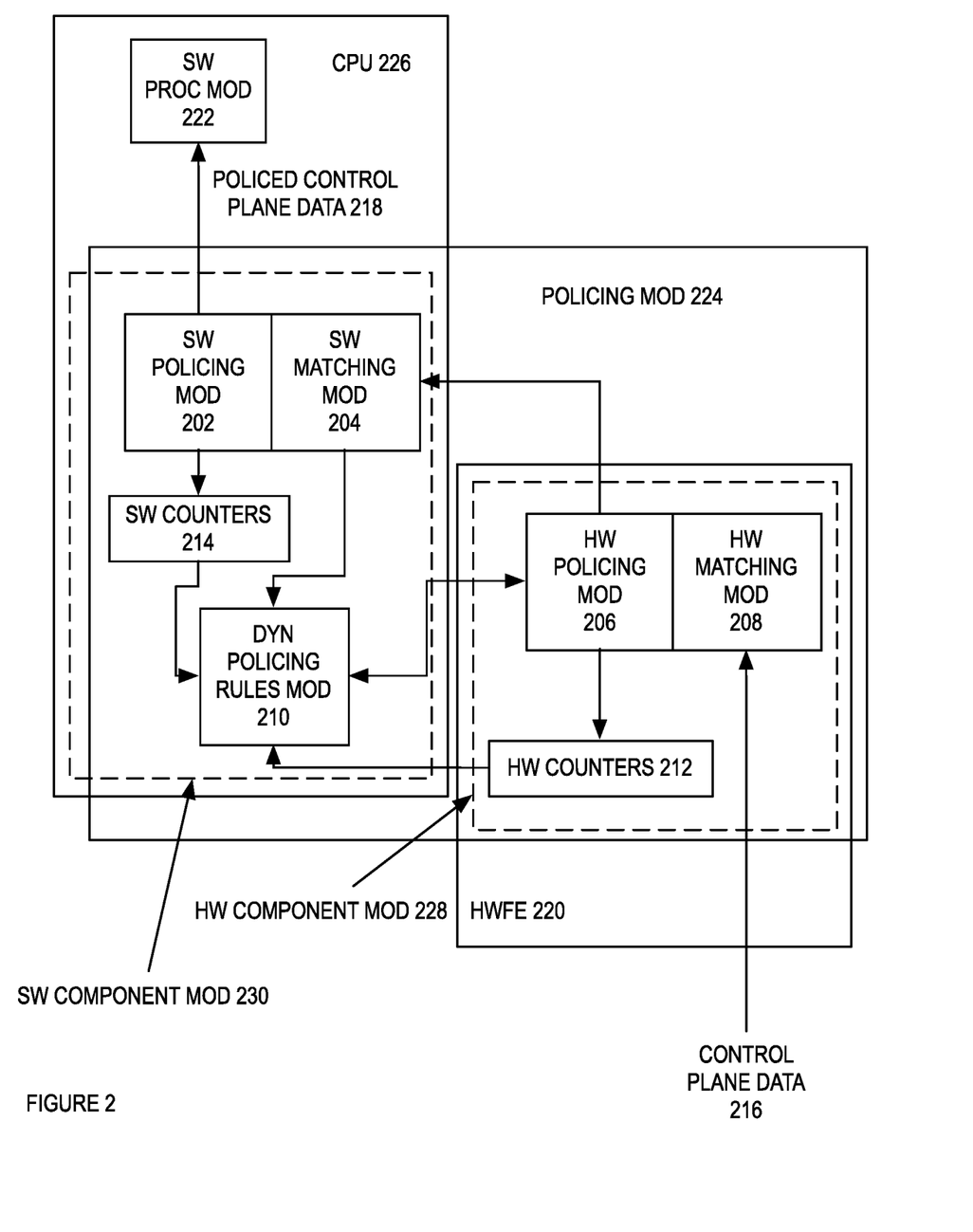
FIG. 2 is a block diagram of one embodiment of a policing module that polices control plane data.

FIG. 2 is a block diagram of one embodiment of a policing module 224 that polices data to the central processing unit (CPU) 226. In FIG. 2, the policing module 224 includes components from the CPU 226 and the HWFE 220. In one embodiment, the policing module 224 includes a software component module 230 that is part of the CPU 226 and a hardware component module 228 that is part of the HWFE 220. In this embodiment, software component module 230 includes the software policing module 202, software matching module 204, software counters 214, and dynamic policing rules module 210. In addition, the hardware component module 228 includes the hardware policing module 206, hardware matching module 208, and hardware counters 212. The CPU also includes a Software processing module 222, which processes the policed control plane data 218. The policing module 224 receives control plane data 216 from the one or more hardware forwarding engines, polices this control plane data 216, and forwards the police control plane data 218 to the Software processing module 222, where the Software processing module 222 processes the policed control plane data 218. In one embodiment, the policing module 224 uses policing rules that can be stored in software and/or hardware. In this embodiment, policing rules in software are stored in system memory (e.g., DRAM), whereas policing rules and hardware can be stored in a specialized memory, such as ternary content addressable memory (TCAM) or other types of content addressable memory. In one embodiment, storing policy rules in software can allow for the storage of more rules than are available for storage in hardware. Storing policy rules in software, however, can lead to slower processing of the control plane data as the Software processing module 222 will perform a lookup on each packet in the control plane data 216 using the software policing rules. In contrast, while a smaller number of policing rules can be stored in hardware, the processing of these rules is much faster because using a hardware forwarding engine such as a content addressable memory or a TCAM, allows the policing module 224 a much faster rules look up for each packet in the control plane data 216. In one embodiment, because storing policing rules and hardware allows for a much faster processing, and policing, of the control plane data 216, it is advantageous to store the policing rules that will more likely be applied to the type of control plane data 216 that is processed by the policing module 224. For example and in one embodiment, if the policing module 224 is receiving numerous Border Gateway Protocol (BGP) packets, but not receiving many spanning tree protocol (STP) packets in the control plane data 216, it makes sense to have BGP policing rules installed in hardware, whereas the STP policing rules can reside in software. In this example, BGP packets would be processed by the BGP rules stored in hardware. Furthermore, because the STP policing rules would be stored in software, any STP packets received by the policing module 224 would be processed by the rules stored in software.

In one embodiment, each of the rules for policing the control plane data 216 includes a classification and a policy. In this embodiment, the classification for the rule is the type of packet classification that would match this rule. The classification can be based on source and/or destination address (e.g., Internet Protocol (IP) or Media Access Control (MAC) address), source and/or destination packet port, source or destination network element port, protocol (e.g., a particular routing protocol, spanning tree protocol, and/or other type of protocol), an arbitrary offset within the packet, another type of network characteristic, and/or a combination thereof.

In one embodiment, if a packet matches a rule, the policy of this rule is applied using one of the policing modules (e.g., the hardware policing module 206 and/or the software policing module 202). In this embodiment, a rule policy can be a policing policy that limits the bandwidth of packets matching this rule to certain rates. A rule policy can have a committed information rate, which allows packets matching this rule to have a base rate of throughput through the policing modules. Packets that have a rate higher than the committed information rate would be dropped. Alternatively, the rule policy can also allow for bursts (e.g. a committed burst size) that would allow for periodic burst of packets matching this rule. In this embodiment, packets within a defined period can be burst above the committed information rate and at or below the committed burst size. Packets that are above the committed burst size are dropped. In one embodiment, the bandwidth limits (e.g. committed information rate, committed burst size, and/or any other type of bandwidth limit) can be specified in packets per second (PPS), bits per second (bps), bytes per second (Bps), and/or another type of measurement for a data rate.

For example and in one embodiment, a rule can be:
Match BGP on any port limit to 1000 packet per second
Match STP on ports 1, 3, 7, committed information rate 100 packets per second, committed burst size of 200 packets In this example, the first rule limits BGP packets from each port to be 1000 PPS. If the packet rate for BGP is greater than this limit, the policing module 224 will drop those packets above the rate. The second rule limits STP packets from ports 1, 3, and 7 to be 100 PPS, while allowing for a burst size of 200 packets. In one embodiment, enforcing each the bandwidth limits can be done using a leaky bucket, token bucket, or another type scheme used to enforce bandwidth limits.

In one embodiment, the policing module 224 includes software policing module 202, software matching module 204, hardware policing module 206, and hardware matching model 208. In this embodiment, the hardware policing module 206 is coupled to the software matching model 204. The hardware matching model 208 includes the rule stored in hardware, such as rule stored in a TCAM. The hardware matching model 208 further receives the control plane data 216 and performs a lookup on each packet in the control plane data 216 to determine if that packet matches one of the rules in the hardware matching module 208. If there is a match to one of the rules stored in the hardware matching model 208, the hardware policing module 206 uses a policy identified by that matching rule to police the packet. For example in in one embodiment, a rule can limit the bandwidth rate of BGP packets received on a port to be 1000 PPS. If the policing of the packet determines that the rate for the matching rule is above threshold, the hardware policing module 206 will drop the packet. In one embodiment, the hardware matching module 208 includes part of the specialized hardware memory, the hardware policing module 206 includes another part of the specialized hardware memory, and the software matching module 204 includes system memory (e.g. DRAM).

If the packet is not dropped by the policing, or there is not a matching rule found in the hardware matching module 208, the hardware policing module 206 forwards the packet to the software matching module 204. In one embodiment, the software policing module 204 performs a lookup of that packet based on the rules stored in software and accessible by the software matching module 204. In this embodiment, if there is a match for the packet, the software policing module 202 polices this packet using the matching rule. If the packet is above a threshold for the matching rule, the software policing module 202 drops the packet. If the packet is at or below the threshold for the matching rule, or there is no matching rule for the packet, the software policing module 202 forwards the packet to the CPU 226.

In one embodiment, because the hardware matching module 208 can perform rule lookups for packets of the control plane data 216 much more quickly than the software matching module 204 and that the number of rules that can be stored in the hardware matching module 208 is smaller than the number of rules stored in the software matching model 204, it is important that the rules installed in the hardware matching module 208 are the rules that apply to the current pattern of packets in the control plane data 216. For example and in one embodiment, if the control plane data 216 is experiencing a high percentage of BGP routing updates, it makes sense to have rules in the hardware matching module 208 that are for policing BGP routing update packets. If the control plane data 216 subsequently has a high percentage of another type of control plane data (e.g., STP packets), then it would make sense for STP policing rules to be installed in the hardware matching module 208.

In one embodiment, the policing module 224 further includes a dynamic policing rules module 210 that dynamically installs and/or evicts policing rules from the hardware matching module 208. In this embodiment, the dynamic policing rules module 210 uses data from the software counters 214 and hardware counters 212 to determine which of the policing rules currently stored in the software matching module 204 should be installed in the hardware matching module 208. In addition, the dynamic policing rules module 210 uses the counter data to determine if any of the currently installed rules in the hardware matching module 208 should be evicted from the hardware matching module 208.

In one embodiment, for each packet processed by the hardware matching module 208, a corresponding counter in the hardware counters 212 is incremented. For example and in one embodiment, there can be counters for overall number of packets processed, packets processed by port, packets processed by each of the rules installed in the hardware matching module 208, and corresponding rules for packets dropped (e.g., overall number of packets dropped, packets dropped by port, packets dropped for each of the rules installed in the hardware matching module 208). Furthermore, and in one embodiment, for each packet processed by the software matching module 204, a corresponding counter in the software counters 214 is incremented. For example and in one embodiment, there can be counters for overall number of packets processed, packets processed by port, packets processed by each of the rules installed in the software matching module 204, and corresponding rules for packets dropped (e.g., overall number of packets dropped, packets dropped by port, packets dropped for each of the rules installed in the software matching module 204). Furthermore, the software counters 214 can include data corresponding to the internal state of the software policing module 202 (e.g. a current filling of any token bucket (or equivalent) used by the software policing module 214).

The dynamic policing rules module 210, in one embodiment, periodically analyzes the software counters 214 to determine if one or more of the policing rules should be installed in the hardware matching module 208. In this embodiment, if one of the counters corresponding to a policing rule is experiencing a high volume of packets, then this rule may be a candidate to be installed in the hardware matching module 208, where the matching is more efficient than the software matching module 204. The dynamic policing rules module 210 can install a rule based on the rate at which packets are processed matching that rule, number of packets dropped for that rule, and/or other criteria. For example and in one embodiment, if the rate of packets processed matching that rule is greater than the allowable bandwidth for that rule, the dynamic policing rules module 210 can promote that rule to be installed in the hardware matching module 208. In another example, and embodiment, the dynamic policing rules module 210 can install a rule if the rate at which packets matching that rule exceed a threshold that may not be associated with the policing parameters of that rule. In this example, the rule that has allowed bandwidth of 100 packets per second and the control plane data 216 matching this rule is 110 packets per second, may not be installed in the hardware matching module 208 because the flow of packets for this rule is not that high. Alternatively, if there is a rule that has an allowed bandwidth of 10,000 packets per second and the current rate for packets matching this rule is 9500 packets per second, this high volume of packets matching this rule may warrant that this rule be installed in the hardware matching module 208. Thus, the dynamic policing rules module 210 dynamically installs rules into the hardware matching module 208 based on the traffic pattern of the control plane data 216.

In one embodiment, the dynamic policing module 210 can include two processes: one process to identify which of the rules is to be installed in the hardware matching module 208 or evicted from the hardware matching module 208 and another process to perform the actual installation or eviction. In another embodiment, the process for identifying which of the rules are to be installed in or evicted from the hardware matching module 208 is a kernel-space process and the process to install or evict the identified rule(s) is a user-space process.

In one embodiment, because the pattern of traffic in the control plane data 216 can change, a rule installed in the hardware matching module 208 may not be utilized enough to warrant continuing to be in the hardware matching module 208. In this embodiment, the dynamic policing rules module 210 periodically analyzes data from the hardware counters 212 and/software counters 214 to determine if one or more of the existing rules in the hardware matching module 208 should be evicted because these rules are underutilized. Furthermore, by evicting one or more rules from the hardware matching module 208, space can be freed for other rules to be installed from the software matching module 204. In one embodiment, the dynamic policing rules module 210 can evict one or more rules based on the rate of packets processed for those rules. For example and in one embodiment, if the rate of packet processing for one or more rules in the hardware matching module 208 falls below a threshold, the dynamic policing rules module 210 can evict that rule from the hardware matching module 208. If a rule is evicted from the hardware matching model 208, packets matching this rule will be policed by the software matching module 204. This eviction can occur periodically based on the hardware counter 212 data or can be done in response to installing a new rule when there is little or no space for the new rule. In one embodiment, the eviction threshold for a rule can be based on the policy of that rule or can be based independently of the rule policy.

Figure 3:
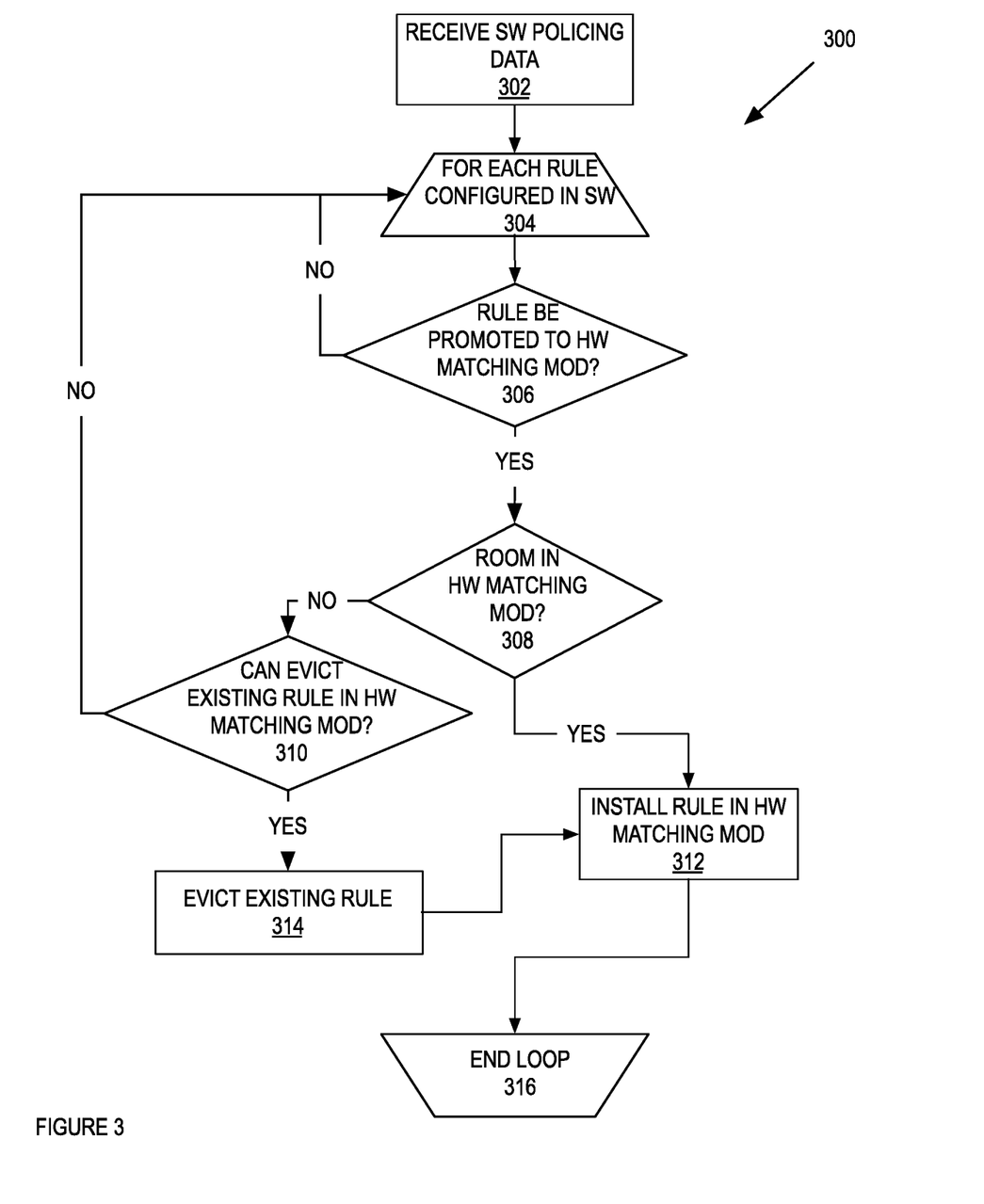
FIG. 3 is a flow diagram on one embodiment of a process to install a policing rule from software storage to hardware storage.

FIG. 3 is a flow diagram on one embodiment of a process 300 to install a policing rule from software storage to hardware storage. In one embodiment, process 300 is performed by a dynamic policing module, such as the dynamic policing module 210 as described in FIG. 2 above. In FIG. 3, process 300 begins by receiving the software policing data at block 302. In one embodiment, the software policing data is the software counter data that is collected by the software matching module as described in FIG. 2 above. Process 300 further performs a processing loop for each rule configured in software to determine if one of these rules should be installed in hardware (blocks 304-316). At block 306, process 300 determines if this rule should be installed in the hardware matching module. In one embodiment, process 300 determines that a rule should be installed in the hardware matching module if the rate of packets processed matching this rule is above a threshold. The threshold can be a threshold that is independent of the bandwidth limitations for that rule, or can be a threshold based on the bandwidth limitations of that rule. If the rule is not to be installed in the hardware matching module, execution proceeds to block 304 above.

If the rule is to be installed in the hardware matching module, process 300 determines if there is room in the hardware matching module at block 308. In one embodiment, process 300 determines if there is room in the hardware matching module by determining if there is a slot (e.g., space) available in the content addressable memory for the hardware matching module. If there is space in the hardware matching module, process 300 installs the rule in the hardware matching module at block 312. In one embodiment, process 300 adds the rule by inserting the rule in the table for the hardware matching module. If there is not available space in the hardware matching module, process 300 determines if one of the existing rules in the hardware matching module can be evicted at block 310. In one embodiment, process 300 can evict one of the existing rules as described in FIG. 4 below. If process 300 cannot evict an existing rule in the hardware module, the rule to be installed will not be installed and execution proceeds to block 304 above. If the existing rule can be evicted, process 300 evicts the existing rule at block 314. In one embodiment, process 300 evicts each existing rule by clearing a slot in the table for the hardware matching module for the rule to be evicted. Execution proceeds to block 312, where process 300 installs the new rule in the hardware matching module. The processing loop ends at block 316.

While in one embodiment, process 300 is performed by a module executing on the network element, in alternate embodiments, some of process 300 can be performed by a controller or network management system. For example and in one embodiment, any or all of blocks 302-310 of process 300 can be performed by the controller or network management system. In this example, if the controller or network management system determines that a policing rule is to be evicted or installed, the controller or network management system sends a command to the network element instructing the network element to evict or install this policing rule.

Figure 4:
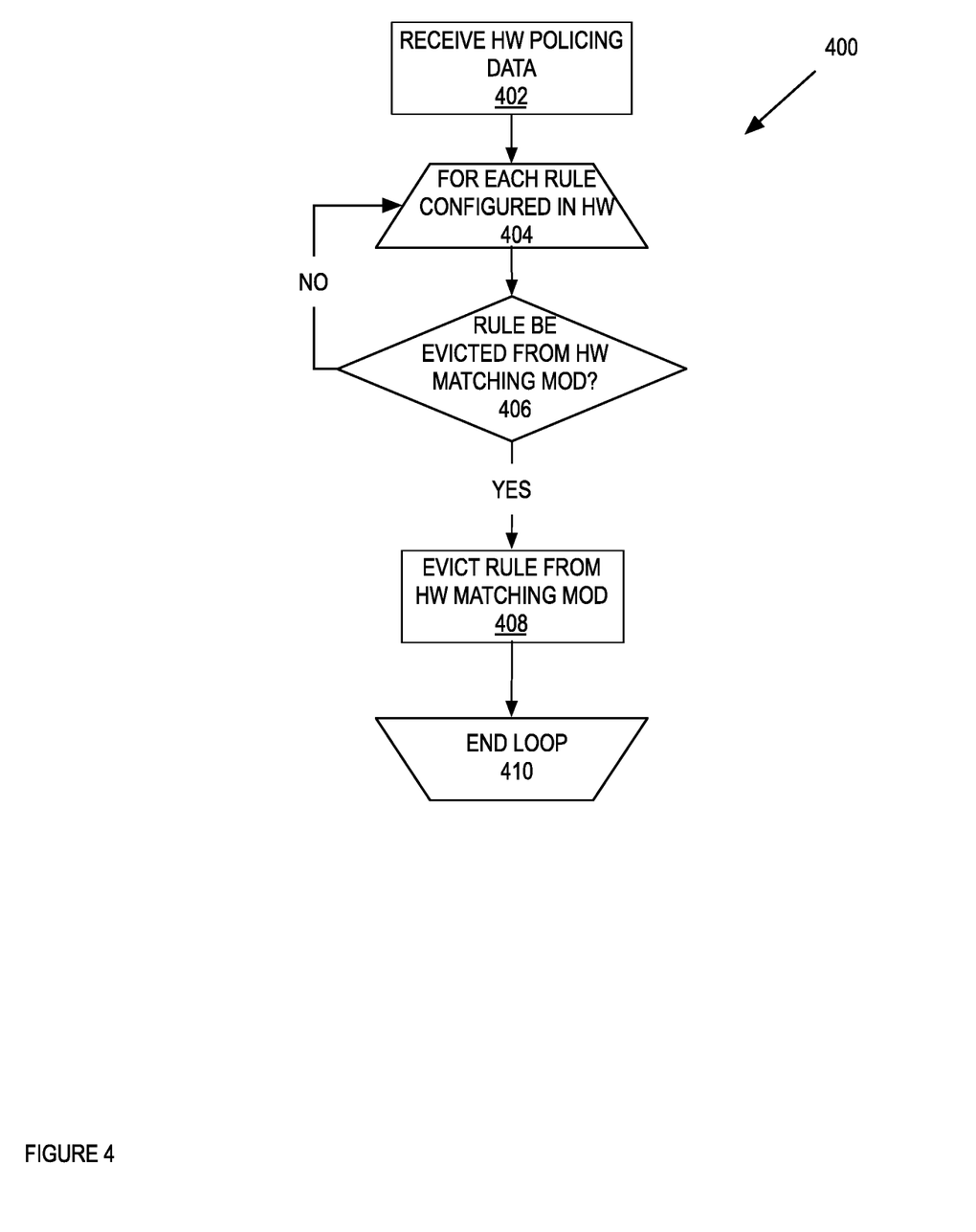
FIG. 4 is a flow diagram of one embodiment of a process to evict a policing rule from hardware storage.

FIG. 4 is a flow diagram of one embodiment of a process 400 to evict a policing rule from hardware storage. In one embodiment, process 400 is performed by a dynamic policing module, such as the dynamic policing module 210 as described in FIG. 2 above. In FIG. 4, process 400 begins by receiving the hardware policing data and/or software policing data at block 402. In one embodiment, the hardware policing data is the hardware counter data and the software policing data is the software counter data that is collected by the hardware and/or software matching module as described in FIG. 2 above. Process 400 further performs a processing loop for each rule configured in hardware to determine if one of these rules should be evicted from hardware (blocks 404-410). At block 406, process 400 determines if a rule can be evicted from the hardware matching module. In one embodiment, process 400 analyzes data from the hardware counters 212 to determine if one or more of the existing rules in the hardware matching module 208 should be evicted because these rules are underutilized. Furthermore, by evicting one or more rules from the hardware matching module 208, space can be freed for other rules to be installed from the software matching module 204. In one embodiment, process 400 can evict one or more rules based on the rate of packets processed for those rules. For example and in one embodiment, if the rate of packet processing for one or more rules in the hardware matching module falls below a threshold, process 400 can evict that rule from the hardware matching module. If a rule is evicted from the hardware matching model, packets matching this rule will be policed by the software matching module 204. This eviction can occur periodically based on the hardware counter data or can be done in response to installing a new rule when there is little or no space for the new rule. If the rule is to be evicted, process 400 evicts the rule from the hardware matching module at block 408. In one embodiment, process 400 evicts the rule by clearing a slot in the table of the hardware matching module. If the rule is not to be evicted, execution proceeds to block 404 above. The processing loop ends at block 410.

Figure 5:
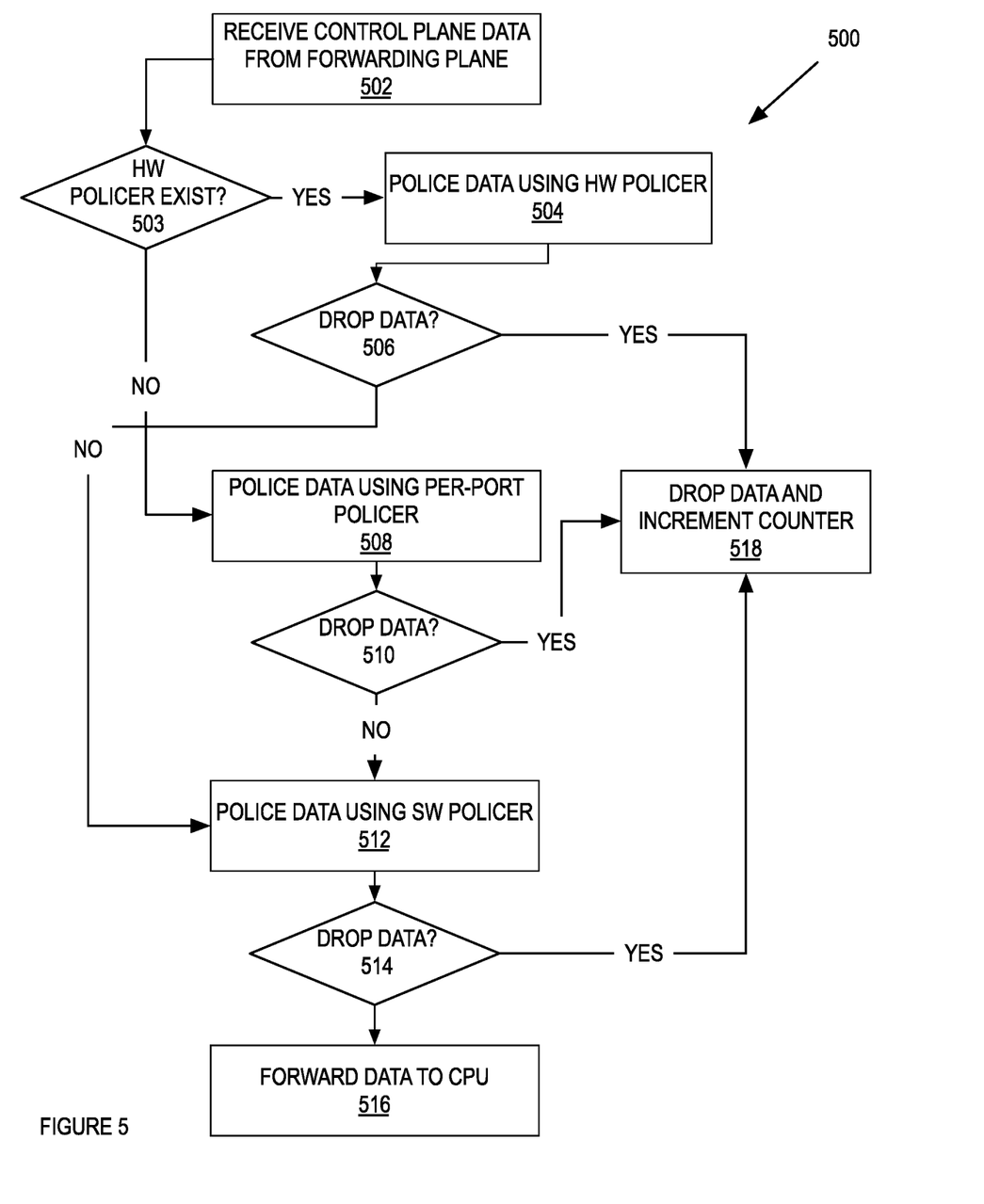
FIG. 5 is a flow diagram of one embodiment of a process to process control plane data using software and hardware policers.

FIG. 5 is a flow diagram of one embodiment of a process 500 to process control plane data using software and hardware policers. In FIG. 5, process 500 begins by receiving control plane data from a forwarding plane at block 502. In one embodiment, process 500 receives the control plane data from the one or more hardware forwarding engines of the one or more switches as described in FIG. 1 above. At block 503, process 500 determines if a hardware policer exists for this control plane data. If a hardware policer exists, execution proceeds to block 504 below. If a hardware policer does not exist, execution proceeds to block 508 below.

At block 504, process 500 polices the data using the hardware policer. In one embodiment, process 500 polices the data by classifying the data, performing a lookup based on the data characterization with the hardware matching module, and policing the data using the matching rule. In one embodiment, and in addition, process 500 increments the relevant counters for this data. For example and in one embodiment, process 500 would increment a counter for all packets processed, per-port packet processed, and matching rule packet processed. Based on the matching rule, process 500 may drop the data at block 506. In one embodiment, process 500 may drop the data if the data rate is above the allowable bandwidth for the matching rule. If process 500 determines to drop the data, execution proceeds to block 518 below.

At block 508, process 500 polices the control plane data using a per port policer. In one embodiment, process 500 polices the packets based on which ports the packets are received on regardless of the type of control plane data. Process 500 determines whether to drop the data at block 510. In one embodiment, if process 500 determines that the rate of packets for that port are above the allowable control plane data bandwidths for that port, process 500 will drop the data. If process 500 determines to drop the data, execution proceeds to block 518 below. If process 500 does not drop the data, execution proceeds to block 512 below.

At block 512, process 500 polices the data using the software policer. In one embodiment, process 500 polices data by characterizing the data, performing a lookup based on the data characterization with the software matching module, and policing the data using the matching rule. Based on the matching rule, process 500 may drop the data at block 514. In one embodiment, process 500 may drop the data if the data rate is above the allowable bandwidth for the matching rule. If process 500 determines to drop the data, execution proceeds to block 518 below. If process 500 does not drop the data, process 500 forwards the data to the CPU at block 516. In one embodiment, and in addition, process 500 increments the relevant counters for this data. For example and in one embodiment, process 500 would increment a counter for all packets processed, per-port packet processed, and matching rule packet processed. At block 518, process 500 drops the data and increments the relevant counter (e.g., packets dropped, packets dropper per-port, and matching rule packets dropped).

Figure 6:
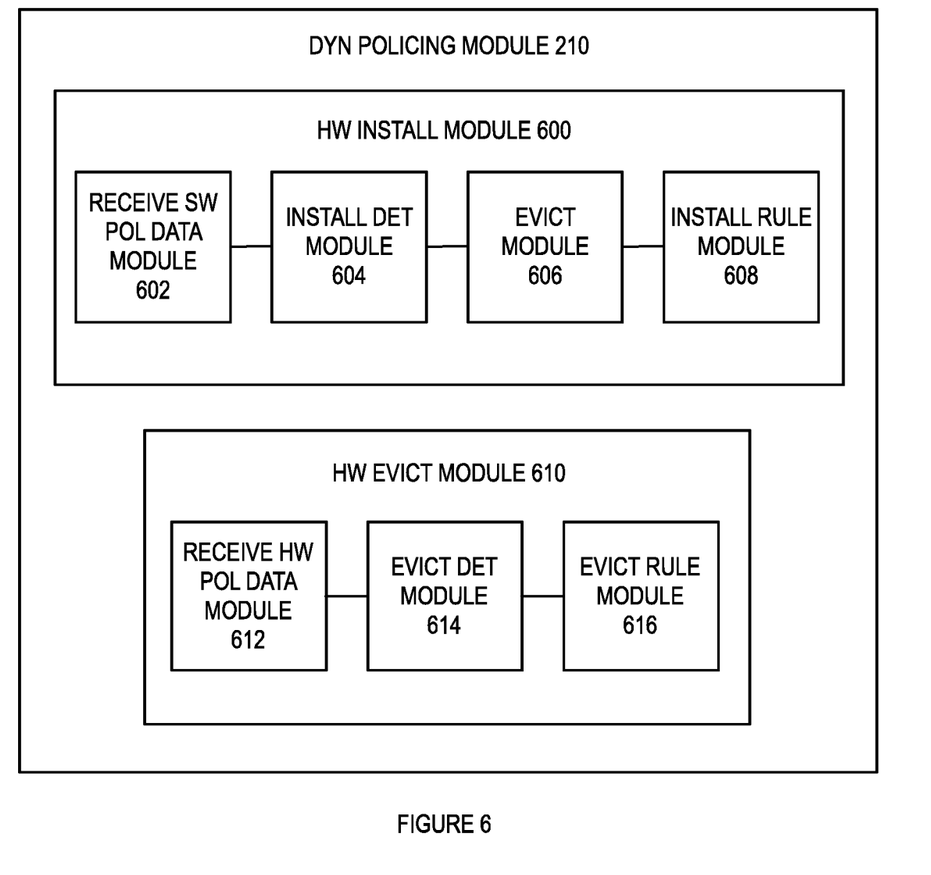
FIG. 6 is a block diagram of one embodiment of a dynamic policing module that installs or evicts a policing rule.

FIG. 6 is a block diagram of one embodiment of a dynamic policing module 210 that installs or evicts a policing rule. In one embodiment, the dynamic policing module 210 includes a hardware install module 600 and hardware evict module 610. In one embodiment, the hardware install module 600 includes receive software policing data module 602, install determination module 604, evict module 606, and install rule module 608. In one embodiment, receive software policing data module 602 receives the software policing data as described in FIG. 3, block 302 above. The install determination module 604 determines if a rule is to be installed in hardware as described in FIG. 3, block 306 above. The evict module 606 determines if a rule is to be evicted as described in FIG. 3, block 310 above. The install rule module 608 installs a rule in hardware as described in FIG. 3, block 312 above.

In one embodiment, the hardware evict module 610 includes receive hardware policing data module 612, evict determination module 614, and evict module 616. In one embodiment, receive hardware policing data module 602 receives the hardware policing data as described in FIG. 4, block 402 above. The evict determination module 604 determines if a rule is to be evicted from hardware as described in FIG. 4, block 406 above. The evict module 606 evicts a rule as described in FIG. 4, block 408 above.

Figure 7:
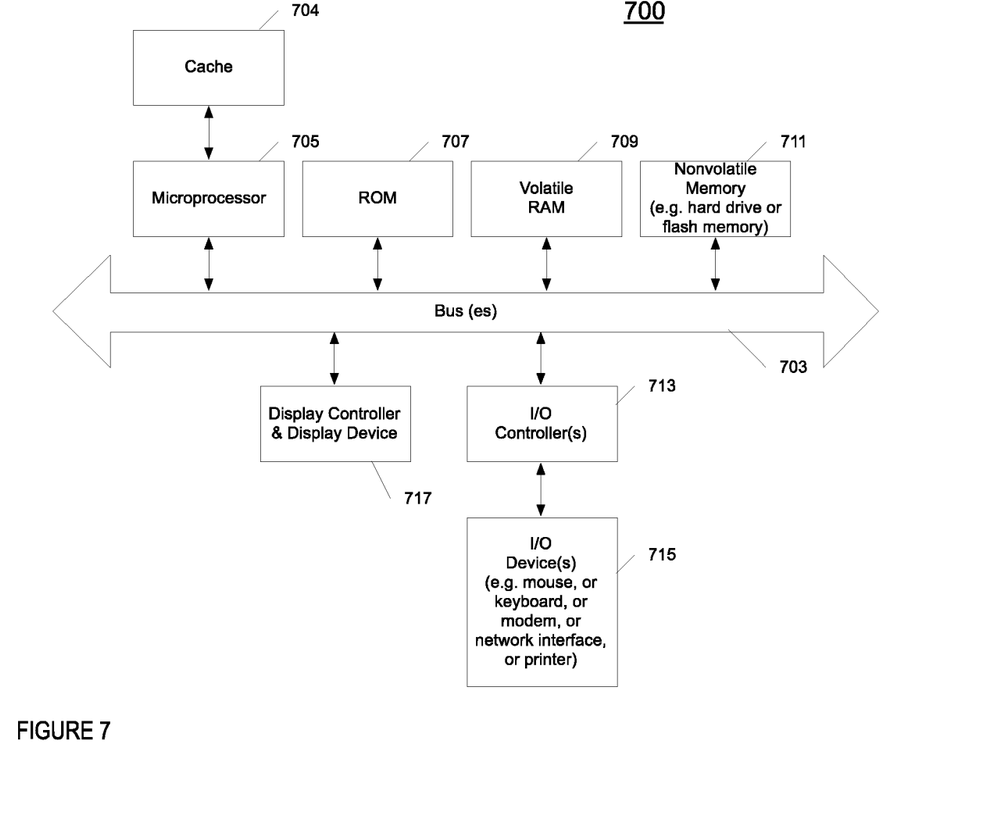
FIG. 7 illustrates one example of a typical computer system, which may be used in conjunction with the embodiments described herein.

FIG. 7 shows one example of a data processing system 700, which may be used with one embodiment of the present invention. For example, the system 700 may be implemented including a network element 100 as shown in FIG. 1. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 717 and to peripheral devices such as input/output (I/O) devices which may be mice, keyboards, modems, network interfaces, printers and other devices which are well known in the art. In one embodiment, the system 700 includes a plurality of network interfaces of the same or different type (e.g., Ethernet copper interface, Ethernet fiber interfaces, wireless, and/or other types of network interfaces). In this embodiment, the system 700 can include a forwarding engine to forward network date received on one interface out another interface.

Typically, the input/output devices 715 are coupled to the system through input/output controllers 713. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 8:
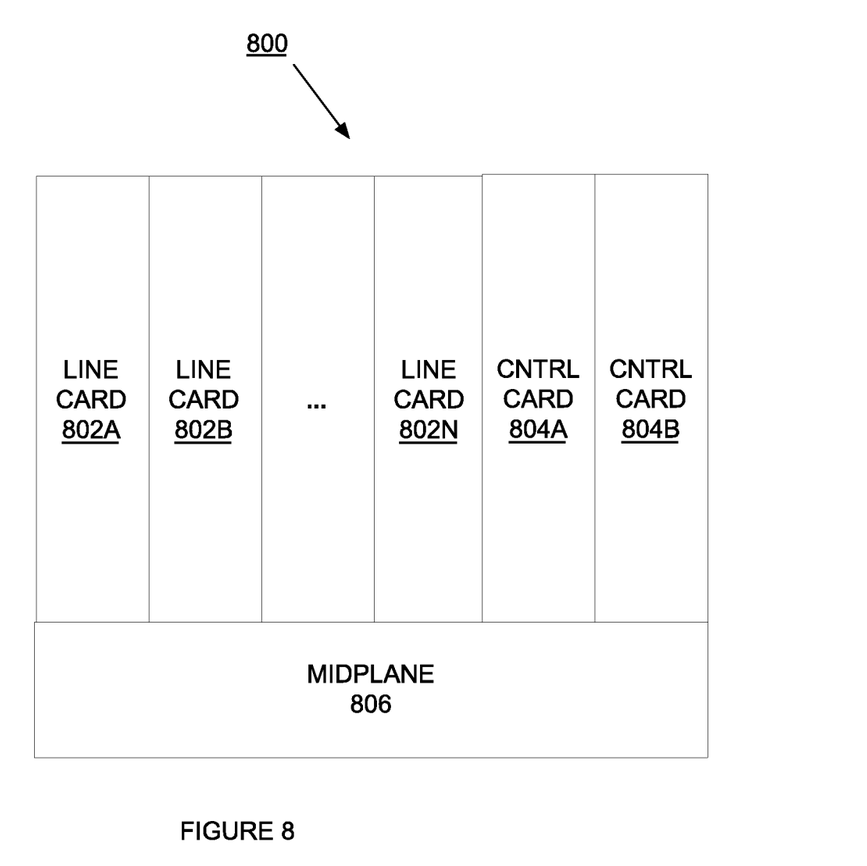
FIG. 8 is a block diagram of one embodiment of an exemplary network element that queues a packet using a packet storage unit.

FIG. 8 is a block diagram of one embodiment of an exemplary network element 800 that queues a packet using a packet storage unit. In FIG. 8, the midplane 806 couples to the line cards 802A-N and controller cards 804A-B. While in one embodiment, the controller cards 804A-B control the processing of the traffic by the line cards 802A-N, in alternate embodiments, the controller cards 804A-B, perform the same and/or different functions (e.g., police control plane data as described in FIGS. 1-4 above). In one embodiment, the line cards 802A-N process and forward control plane to the controller cards 804A-B. It should be understood that the architecture of the network element 800 illustrated in FIG. 8 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "determining," "installing," "evicting," "storing," "identifying," "updating," "processing," "sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to install a candidate policing rule from system memory to specialized hardware memory in a network element, the method comprising:
    receiving control plane data processing statistics of control plane data that is received by the network element, wherein the control plane data is processed by a control plane of the network element and is policed using a plurality of control plane data policing rules stored in the system memory;
    determining that the candidate policing rule is being utilized greater than a threshold based on at least the control plane data processing statistics, wherein the candidate policing rule is one of the plurality of control plane data policing rules stored in the system memory; and
    installing the candidate policing rule in the specialized hardware memory, wherein the candidate policing rule is subsequently used by the network element to police the control plane data.

2. The machine-readable medium of claim 1, wherein the system memory is dynamic random access memory.

3. The machine-readable medium of claim 1, wherein the specialized hardware memory includes content addressable memory.

4. The machine-readable medium of claim 3, wherein the content addressable memory is ternary content addressable memory.

5. The machine-readable medium of claim 3, wherein the specialized hardware memory is associated with a hardware forwarding engine.

6. The machine-readable medium of claim 5, wherein the specialized hardware memory is part of the hardware forwarding engine.

7. The machine-readable medium of claim 1, wherein the control plane data processing statistics includes number of packets processed for each of the plurality of control plane data processing rules.

8. The machine-readable medium of claim 1, wherein the installing comprises:
    determining that there is space available in the specialized hardware memory; and
    installing the candidate policing rule in the available space.

9. The machine-readable medium of claim 8, wherein the determining that there is the space available comprises:
    evicting an existing rule in the specialized hardware memory if there is not the space available.

10. The machine-readable medium of claim 1, wherein each of the plurality of control plane data policing rules includes a classification and a policy, wherein the classification defines a class of control plane data that this control plane data policing rule applies to and the policy is a rule that is used to rate limit the class of control plane data.

11. The machine-readable medium of claim 1, wherein at least some packets of the control plane data include a destination address that is an address of the network element.

12. The machine-readable medium of claim 1, wherein control plane data is policed by,
    monitoring a rate of a class of the control plane data;
    comparing the monitored rate of the control plane data class to a threshold; and
    taking an action when the monitored rate is above the threshold.

13. A non-transitory machine-readable medium having executable instructions to cause one or more processing units to perform a method to evict a policing rule from specialized hardware memory in a network element, the method comprising:
    receiving control plane data processing statistics of control plane data that is received by the network element, wherein the control plane data is processed by a control plane of the network element and is policed using a plurality of control plane data policing rules stored in the specialized hardware memory;

determining that the candidate policing rule is being utilized less than a threshold based on at least the control plane data processing statistics, wherein the candidate policing rule is one of the plurality of control plane data policing rules stored in the specialized hardware memory; and evicting the candidate policing rule from the specialized hardware memory, wherein the candidate policing rule is stored in system memory and is subsequently used by the network element to police the control plane data.

14. A method to install a candidate policing rule from system memory to specialized hardware memory in a network element, the method comprising:

receiving control plane data processing statistics of control plane data that is received by the network element, wherein the control plane data is processed by a control plane of the network element and is policed using a plurality of control plane data policing rules stored in the system memory;

determining that the candidate policing rule is being utilized greater than a threshold based on at least the control plane data processing statistics, wherein the candidate policing rule is one of the plurality of control plane data policing rules stored in the system memory; and installing the candidate policing rule in the specialized hardware memory, wherein the candidate policing rule is subsequently used by the network element to police the control plane data.

15. The method of claim 14, wherein the system memory is dynamic random access memory.

16. The method of claim 14, wherein the specialized hardware memory includes content addressable memory.

17. The method of claim 16, wherein the content addressable memory is ternary content addressable memory.

18. The method of claim 16, wherein the specialized hardware memory is associated with a hardware forwarding engine.

19. The method of claim 18, wherein the specialized hardware memory is part of the hardware forwarding engine.

20. The method of claim 14, wherein the control plane data processing statistics includes number of packets processed for each of the plurality of control plane data processing rules.

21. The method of claim 14, wherein the installing comprises:

determining that there is a space available in the specialized hardware memory; and installing the candidate policing rule in the available space.

22. The method of claim 21, wherein the determining that there is the space available comprises:

evicting an existing rule in the specialized hardware memory if there is not the space available.

23. The method of claim 14, wherein each of the plurality of control plane data policing rules includes a classification and a policy, wherein the classification defines a class of control plane data that this control plane data policing rule applies to and the policy is a rule that is used to rate limit the class of control plane data.

24. The method of claim 14, wherein at least some packets of the control plane data include a destination address that is an address of the network element.

25. A method to evict a policing rule from specialized hardware memory in a network element, the method comprising:

receiving control plane data processing statistics of control plane data that is received by the network element, wherein the control plane data is processed by a control plane of the network element and is policed using a plurality of control plane data policing rules stored in the specialized hardware memory;

determining that the candidate policing rule is being utilized less than a threshold based on at least the control plane data processing statistics, wherein the candidate policing rule is one of the plurality of control plane data policing rules stored in the specialized hardware memory; and evicting the candidate policing rule from the specialized hardware memory, wherein the candidate policing rule is stored in system memory and is subsequently used by the network element to police the control plane data.

* * * * *